Nov. 20, 1928. Re. 17,141

G. ROSENQVIST

APPARATUS FOR PRODUCING ARTICLES BY ELECTROLYTIC DEPOSITION

Original Filed Feb. 24, 1925

INVENTOR

Gunnar Rosenqvist by

William B. Jaspert, his Attorney.

Reissued Nov. 20, 1928.

Re. 17,141

UNITED STATES PATENT OFFICE.

GUNNAR ROSENQVIST, OF PITTSBURGH, PENNSYLVANIA.

APPARATUS FOR PRODUCING ARTICLES BY ELECTROLYTIC DEPOSITION.

Original No. 1,594,509, dated August 3, 1926, Serial No. 11,000, filed February 24, 1925. Application for reissue filed August 11, 1927. Serial No. 212,326.

This invention relates to improvements in apparatus for producing metallic articles by means of electrolytic deposition, one of the objects of the invention being to provide an apparatus of this character in which the solution comes in contact only with the interior of the metal mold, whereby the necessity for covering the exterior of the mold with insulating material is avoided.

A further object of the invention is to provide an apparatus of the character set forth, in which the scrap metal anode can easily be washed off and in which the solution is always filtered and clear when it comes to the metal mold.

A further object of the invention is to provide an apparatus in which the interior surface of the deposited metal is ground, polished and hardened during the depositing process.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

The same characters of reference designate the same parts in the different figures of the drawings.

In apparatus of this general character heretofore used, it has been the practice to immerse the entire mold in a tub containing the solution forming the electrolyte. Under such procedure, however, the exterior of the mold must be completely covered with insulating material in order to prevent deposition thereon as well as on the inside of the mold. Moreover, the contacts and connecting wires always become coated with the deposit, since it is extremely difficult to insulate them. The object of the present invention is to provide an apparatus in which the necessity for insulating either the exterior surface of the metal mold or the contacts is avoided by reason of the fact that the solution never comes in contact therewith.

Figure 1:
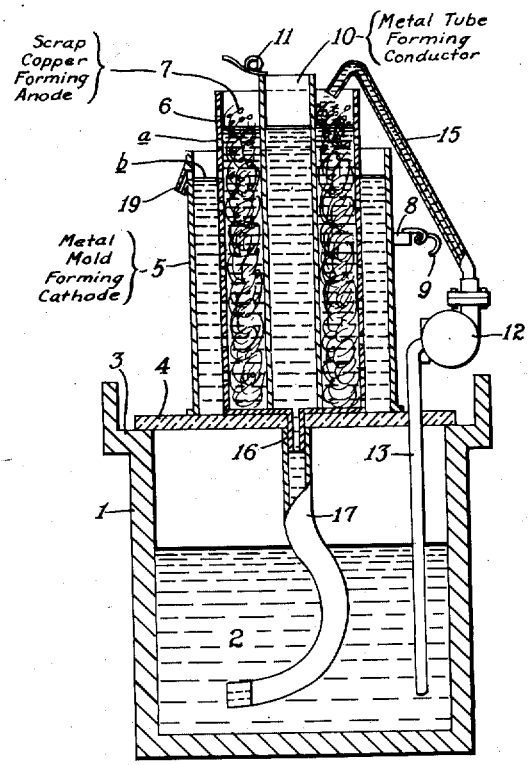
Fig. 1 is a vertical central section through an apparatus embodying the features of the present invention.

Referring first to Fig. 1 of the drawings, 1 designates the container for an electrolytic solution 2, said container being preferably formed at its top to provide a shoulder 3 for supporting a platform 4. Mounted on the platform is a mold 5 of metal or other permanent material which may be of cylindrical, octagonal, hexagonal or any other desired form in cross section, and is preferably made of a plurality of sections secured together. Within the mold, in concentric relation therewith, is a so-called basket 6 formed of perforated lead or other acid-resisting porous material for the reception of scrap copper 7 forming the anode. The mold 5 is provided at the exterior thereof with a terminal 8 for connection by means of a wire 9 with one terminal of a suitable source of electric current. Within the basket 6 is supported on the platform 4 a tubular member 10 of conducting metal, the upper end of which extends above the top of the basket and has attached thereto in any suitable manner a wire 11 for connection with the other terminal of the source of current. A pump 12 of any suitable construction is disposed in any convenient position for pumping the solution from the container 1 into the basket 6, said pump communicating with the interior of the container by means of a pipe 13 which extends to a point near the bottom of the container. A flexible tube 15 of rubber or other material communicates with the delivery end of the pump and is bent at its upper end so as to deliver the solution upon the scrap copper within the basket 6. The bottom of the basket is provided with an outlet nipple 16 adapted to form a connection for a rubber hose 17, which hose extends to the bottom of the container 1 and is provided in its lower end with a plug having a comparatively small delivery opening therein for promoting circulation of the solution at the bottom of the container. The metal mold 5 is provided near its upper end with an overflow opening having a nipple 19 to which may be attached a pipe or hose, not shown, for returning the surplus solution to the container 1.

The operation of the device so far described is as follows:

The basket 6 being filled with scrap copper and the current turned on, the pump is started and the operation thereof is continued until the height of the solution in the basket reaches the level indicated by the line *a*, the solution penetrating through the basket until it reaches the level indicated by the line *b* in the metal mold. The operation of the pump is regulated so as to maintain the solution at these levels. The solution acts on the scrap copper in the basket and the deposit is made on the inner surface of the metal mold 5. After the deposition is completed, the sections of the mold may be disconnected one from the other and removed, and if the molded article is in a single piece the rubber pipe 15 is swung aside so as to permit the article to be lifted from the platform without disturbing the basket 5 and the central contact member 10. On the other hand, if the article is made in a number of pieces corresponding with the section of the mold, each piece is removed with the section of the mold on which it was deposited as will be more fully described hereinafter.

When it is desired to wash the scrap metal in the basket, the rubber hose 17 is lifted out of the tub 1 so that it will drain outside thereof. Fresh water may then be sprayed over the scrap copper in the basket and allowed to drain off through the rubber hose.

Figure 3:
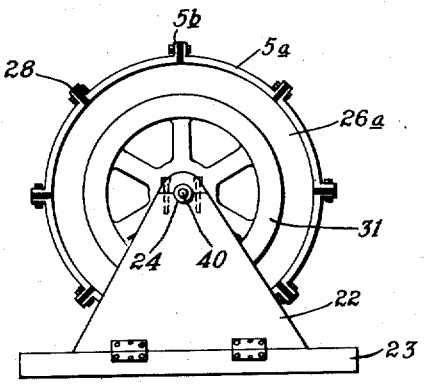
Fig. 3 is an end view of the apparatus shown in Fig. 2.
Figure 2:
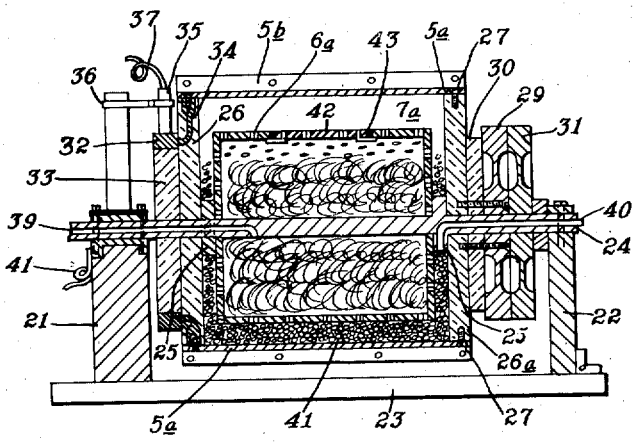
Fig. 2 is a similar view of a modified form of apparatus.

Referring now to Figs. 2 and 3, I have illustrated therein a mold which is capable of rotation. To this end a pair of standards or brackets 21 and 22 are supported on a base 23, one at each end thereof, said standards being each provided at its upper end with a bearing for receiving a rod or shaft 24, preferably of stainless steel, the rod being intended to be maintained against rotation in the standards. Upon that portion of the rod 24 which extends between the brackets 21 and 22 is supported a basket $6^a$, of perforated lead or other porous material, the rod being provided with a pair of collars or shoulders 25 for maintaining the basket against axial movement, said basket being adapted to contain scrap copper $7^a$. The collar 25 at the left of Fig. 2 is shown threaded on the rod so as to permit removal of the basket. Outside of the ends of the basket a pair of disks 26 and $26^a$ of ebonite or other suitable insulating material are mounted on the rod 24, said disks forming heads or ends of a drum or mold, the body $5^a$ of which is made of metal and is secured to the disks by means of screws 27 or in any other suitable manner. The body of the mold, like that of Fig. 1, may be either in a single piece or made up of a plurality of sections each having a pair of longitudinal flanges $5^b$ extending out from its side edges, the flanges of each section being bolted to the flanges of contiguous sections, as shown in Fig. 3. The drum may also be cylindrical, octagonal or any other desired form in cross section. When it is desired to use the mold for forming a plurality of separate articles, the flanges of the sections are separated from each other by a layer of insulating material 28, while if it is desired to form a single hollow article the insulating layers may be omitted. For rotating the mold, a pulley 29 is mounted on the rod and is secured to the disk $26^a$, a spacing washer 30 being interposed between the pulley and disk. A second pulley 31 is mounted for rotation on the rod 24 in juxtaposition to the pulley 29. Rotary motion may thus be imparted to the mold by means of a belt connection from any suitable source of power, while, by shifting the belt from the fast pulley 29 to the loose pulley 31, the rotation of the mold may be discontinued at any time.

For establishing electrical connection between the mold and a source of current, a ring contact member 32 is carried by an insulating disk 33 which may be formed integral with the disk 26 or secured thereto in any suitable manner. The ring 32 is electrically connected with the mold $5^a$ by a short wire 34 which passes through an opening in the disk 26. A contact brush 35 carried by a bracket 36 mounted on the standard 21, is held in contact with the ring 32 and is connected by a wire 37 with one pole of the source of current not shown, the other pole being electrically connected in any suitable manner with the rod 24, as for instance by a wire 41.

For supplying the solution to the scrap copper in the basket, a tube 39 passes through a bore in one end of the rod 24 and communicates with the interior of the basket, said tube being adapted to communicate at its outer end with the delivery end of a pump similar to that shown in Fig. 1 for pumping the solution from a container, while a tube 40 communicates through a bore in the opposite end of the rod, with the space between the basket and the disk $26^a$, for returning the surplus solution to the tub.

In the form of the apparatus shown in Figs. 2 and 3, I have provided means for grinding and polishing the interior surface of the deposited metal. This means comprises a mass of granular material 41, which may consist of glass balls or other hard substances which, when the mold is rotated around the basket, will abrade the surface of the deposited metal and thus grind and polish the inside thereof and remove any unevenness.

As hereinbefore stated, the mold may be used to form a single article of cylindrical or other form in cross section, or a number of separate articles corresponding with the number of sections of the mold. When the article is formed in one piece, provision must be made for permitting its removal from the apparatus. To that end, I have illustrated in Figs. 2 and 3 the standard 22 as hingedly secured to the base and the bearing at the upper end of this standard is split, so that on releasing the top part of the bearing the standard may be swung toward the right of Fig. 2, free of the rod 24. Thereupon, after the screws 27 have been removed, the disk 26[a], together with the pulleys 30 and 31, may be removed from the rod 24, thus affording access to the end of the deposited article, which can then be readily removed. It will be observed that the standard 21 is made of substantial thickness so as to support the weight of the apparatus when the standard 22 has been swung out of supporting position.

For affording access to the interior of the basket to permit the same to be filled, a portion 42 thereof is made removable, and is provided with a pair of latches 43 for retaining it in position when closed.

Having thus described my invention, what I claim is:

1. An apparatus of the character described, comprising in combination a container for an electrolytic solution, a metal mold capable of holding a solution disposed outside of said container, a support disposed within said metal mold and adapted to contain scrap copper, means for causing the circulation of the solution from said container through said support and means for electrically connecting said scrap copper and mold with a source of current.

2. An apparatus of the character described, comprising, in combination, a container for an electrolytic solution, a metal mold disposed outside of said container, said mold being formed of a plurality of sections, detachably connected together, a basket disposed within said metal mold and adapted to contain scrap copper, means for causing a circulation of the solution from said container through said basket, and means for electrically connecting said scrap copper and mold with a source of current.

3. An apparatus of the character described, comprising in combination, a container for an electrolytic solution, a metal mold disposed outside of said container, said mold being formed of a plurality of sections detachably connected together, a basket disposed within said metal mold and adapted to contain scrap copper, a pump for transferring the solution from said container to the interior of said basket, means for returning the solution to said container, and means for electrically connecting said scrap copper and mold with a source of current.

4. Apparatus for producing articles by means of electrolytic deposition, comprising, in combination a container for an electrolytic solution, a hollow metal mold capable of holding a solution and consisting of a plurality of sections, an anode suspended in said mold, means for circulating an electrolytic solution from said container through said mold to cover the anode and the inner surface of the mold upon which the deposition is to be made, and means for electrically connecting said anode and mold with a source of current.

5. Apparatus for producing articles by electrolytic deposition comprising, in combination a container for an electrolytic solution, a hollow mold capable of holding a solution disposed outside of said container, an anode suspended in said mold, a pump for circulating the solution from said container through said mold, means for maintaining the solution in the mold at a predetermined level and means for electrically connecting said anode and mold with a source of current.

6. Apparatus for producing articles of electrolytic deposition comprising in combination a container for an electrolytic solution, a liquid holding receptacle disposed outside of said container, a substantial portion of the inner walls of said receptacle constituting an electrical conductive mold surface for receiving a deposit, a support within the receptacle holding pieces of metal to be deposited, means for circulating the electrolytic solution from the container into said receptacle and between said pieces of metal and from the receptacle back into the container, means for electrically constituting the pieces of metal held by said support, an anode, and the electrical conductive mold surfaces, a cathode.

In testimony whereof I have signed my name to this specification.

GUNNAR ROSENQVIST.